Nov. 25, 1969  E. E. REIBER  3,480,303
CONNECTORS FOR CABLE CONDUITS
Filed June 21, 1968  3 Sheets-Sheet 1
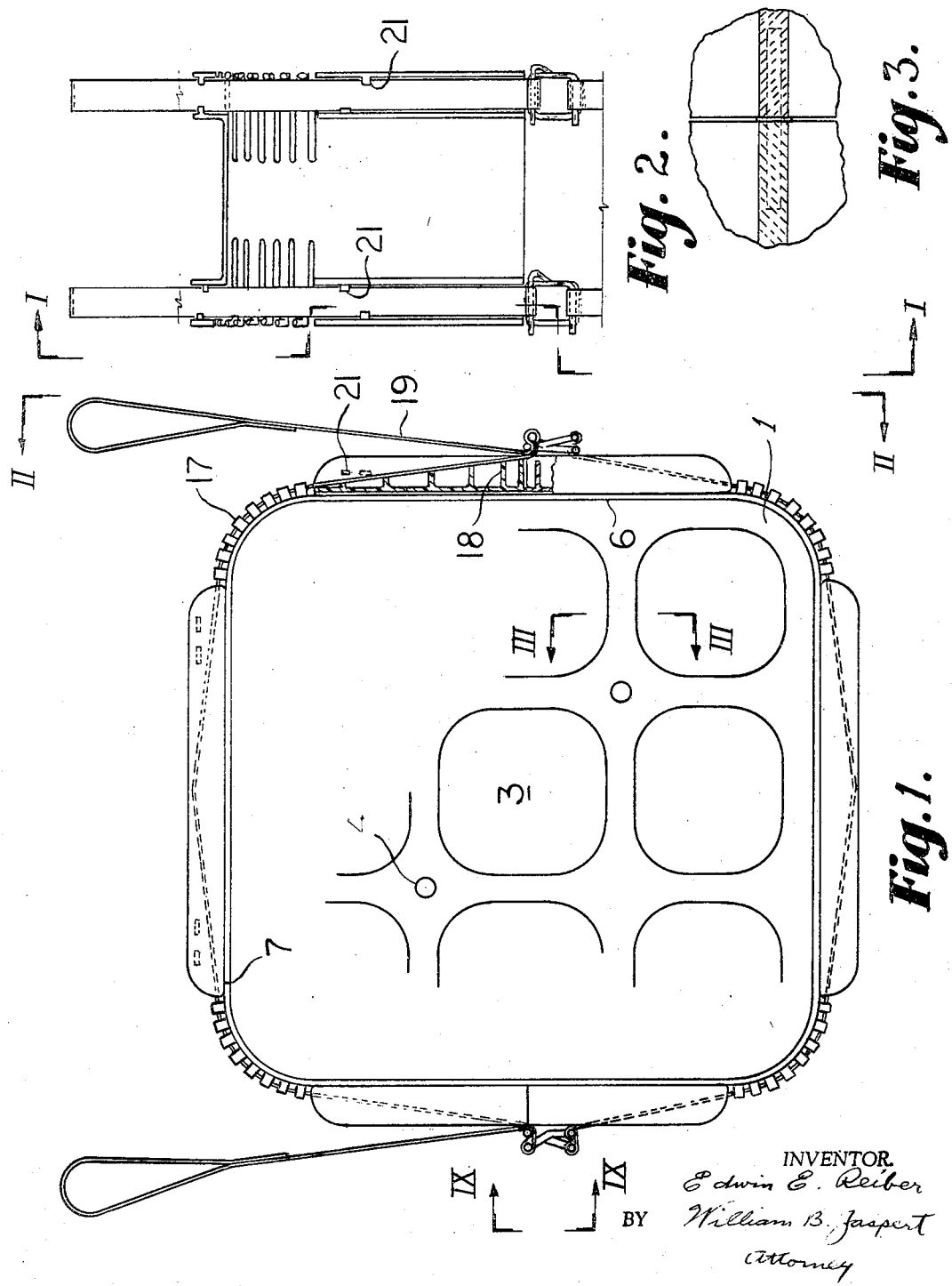

Nov. 25, 1969   E. E. REIBER   3,480,303
CONNECTORS FOR CABLE CONDUITS
Filed June 21, 1968   3 Sheets-Sheet 2
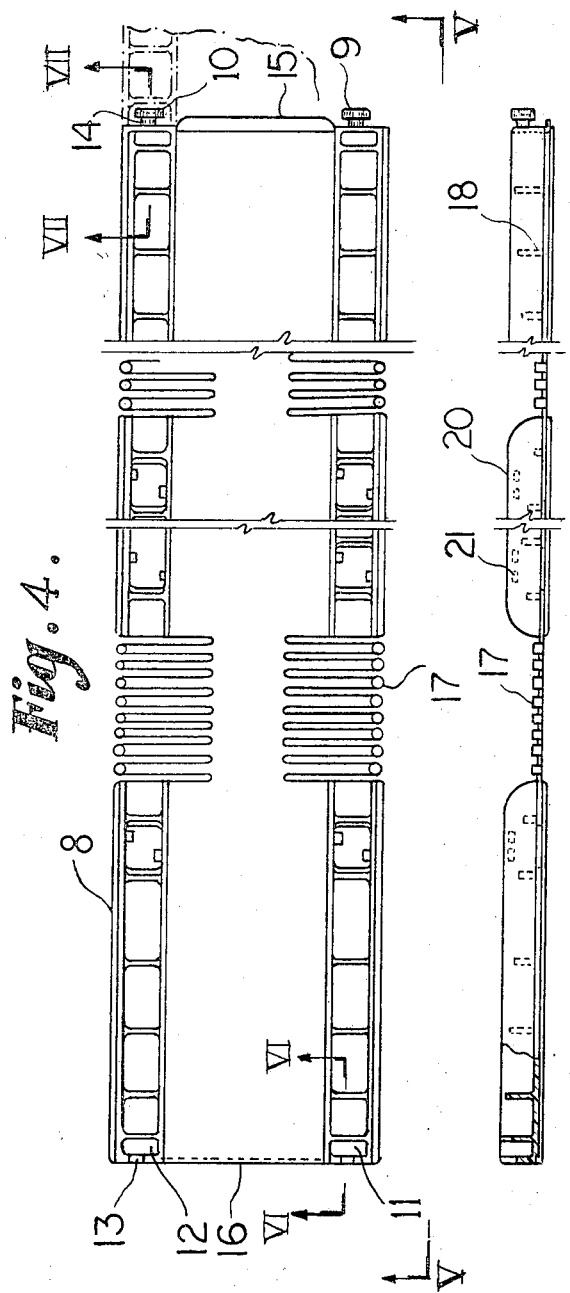
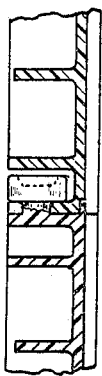
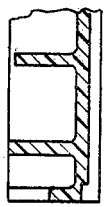
INVENTOR.
Edwin E. Reiber
BY William D. Jaspert
Attorney Nov. 25, 1969    E. E. REIBER    3,480,303
CONNECTORS FOR CABLE CONDUITS
Filed June 21, 1968    3 Sheets-Sheet 3
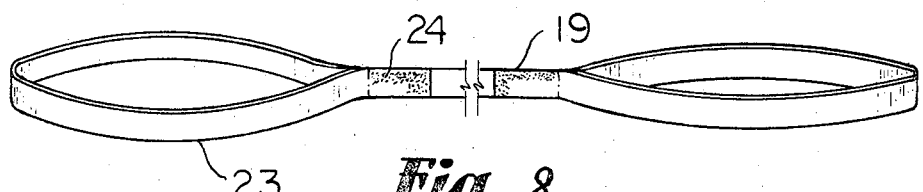
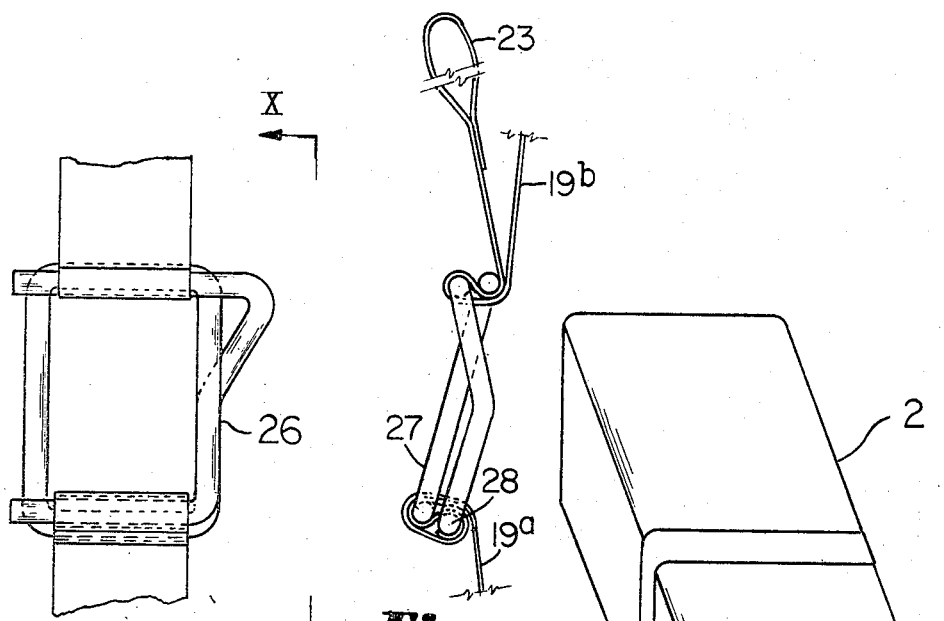
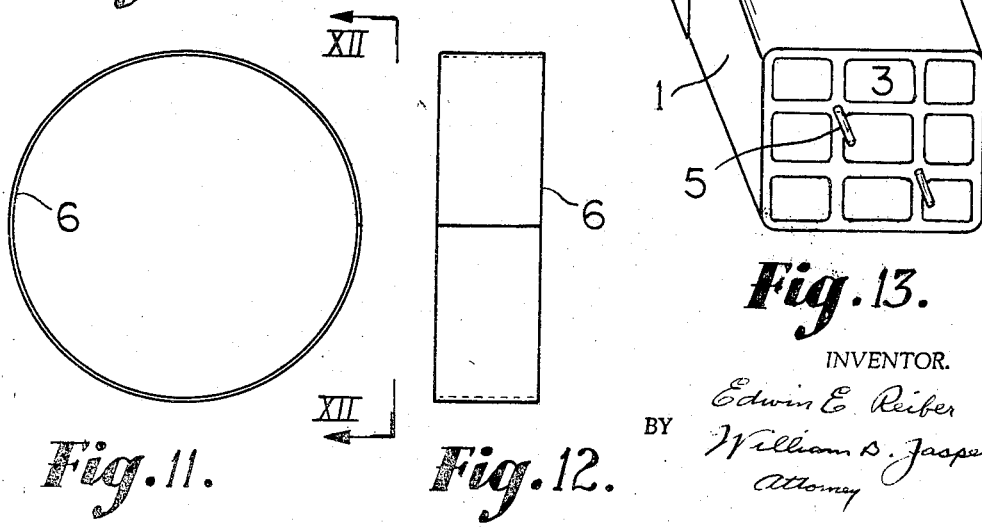
INVENTOR.
Edwin E. Reiber
BY William D. Jasper
Attorney United States Patent Office 3,480,303
Patented Nov. 25, 1969

3,480,303
CONNECTORS FOR CABLE CONDUITS
Edwin E. Reiber, 505 King Ave.,
Columbus, Ohio 43200
Filed June 21, 1968, Ser. No. 738,879
Int. Cl. F16l 21/02, 19/00, 17/00, 33/18
U.S. Cl. 285—373     3 Claims

ABSTRACT OF THE DISCLOSURE

The disclosure deals with sealing off the connected ends of cable conduits having several ducts in which the cable is laid and separated from each other. The purpose of the connectors, which are made of suitable water-resistant materials, is to prevent the accumulation of slit in the conduits so that the ducts will be kept open and clean to permit the easy drawing of cables therethrough. The ends of the conduits are provided with aligning members and the connectors are drawn into intimate contact with the outer surface of the conduit by means of straps which are also the fastening means and which are buried underground with the conduits.

PURPOSE

This invention relates to new and useful improvements in connectors for conduits of clay or other material, used to convey cable for telephone or other electrical or mass transfer systems.

STATE OF THE ART

It is a common practice to install telephone cables or other cables in multiduct conduits underground, where the cables are laid separate from one another, in separate ducts of the conduit. The conduit sections are laid end to end in a trench. A connecting device is required at the junctures of the conduit sections to prevent the entrance of silt which could accumulate and block the ducts so that additional cables could not be drawn through subsequent to the initial laying of the conduit line.

These conduits may be made of clay, concrete, or other materials. A concrete conduit in present usage has a rectangular cross section with rounded corners. Each end of this conduit has a slight taper. Concrete conduit is molded with rather precise dimensions. This conduit is connected by forcing a molded, rectangular, plastic sleeve or tube onto the tapered end of one conduit, placing the conduit into the trench and forcing another conduit tapered end into the other end of the plastic sleeve so that the conduit sections abut one another within the plastic sleeve.

Clay conduit is extruded, air dried, and then baked or fired. Due to the production process and due to the inconsistency of clay, this conduit has considerable variation in peripheral dimension and in cross-section geometry. The ends of the extruded clay conduit are usually plain and straight. There are at present several means of joining this conduit which are familiar to those skilled in the art.

(1) A mixture of portland cement is spread onto a strip of fabric gauze. The gauze is folded over the cement and the gauze and cement are then wrapped around the conduit at a juncture, in the manner of a medical bandage.

(2) A pitch-like adhesive is spread generously on the exterior surfaces of the conduit at a juncture. A suitable length of a thin, soft, plastic or rubber-like material is cut from a roll of suitable width and wrapped tightly around the conduit, over the adhesive spread at the juncture, and overlapped upon itself.

(3) A suitable length of a soft rubber-like material which has been coated with a pitch-like adhesive is cut from a roll of suitable width and wrapped tightly around the conduit at the juncture and overlapped upon itself. Special metal clips are then hammered through the rubber-like material to secure the end of the band.

SUMMARY OF THE INVENTION

The conduits are fitted with self-aligning dowel pins and brought into abutting end to end relation with the cable ducts in alignment. The joints are sealed by a shell liner and secured by draw bands. The shell liners fit loosely around the corner rounded rectangular conduits and the draw bands have ribs of graduated length and tabs to conform to the sealer shell around the corners and sides to provide uniform tension thereto.

DISCLOSURE

The invention will become more apparent from a consideration of the accompanying drawings constituting a part hereof in which like reference characters designate like parts and in which:

FIGURE 1 is an end elevation view of a clay conduit connector embodying the principles of this invention taken along the line 1—1 of FIGURE 2;

FIGURE 2 is a side elevational view taken along the line 2—2 of FIGURE 1;

FIGURE 3 is a section taken through the line 3—3 of FIGURE 1;

FIGURE 4 a top plan view of the connector shell-half;

FIGURE 5 is a side view taken along the line 5—5, FIGURE 4;

FIGURE 6 a section taken along the line 6—6 of FIGURE 4;

FIGURE 7 a section taken along the line 7—7, FIGURE 4;

FIGURE 8 is a view in perspective of the top strap;

FIGURE 9 a top plan view of the straps and buckle taken along the line 9—9, FIGURE 1;

FIGURE 10 a side elevation taken along the line 10—10, FIGURE 9;

FIGURES 11 and 12 an end view and side elevation, respectively, of a shell liner; and FIGURE 13 is an isometric view of a pair of clay telephone cable conduits joined by the connector embodying the principles of this invention.

With reference to FIGURE 13, the numeral 1 designates a telephone cable conduit in end-to-end relation with a similar conduit numbered 2, which are joined in a manner hereinafter described, and sealed by a shell, liner and two draw band assemblies. FIGURE 1 shows the clay telephone cable conduit of FIGURE 13 with ducts 3 for receiving the telephone cables, the web walls of the ducts being provided with holes and recesses 4 at both ends and dowel pins 5, FIGURE 13, which fit into the holes and recesses 4 to bring the ends of the conduits in suitable alignment and prevent displacement thereof when assembled.

The conduit connector shown around the conduit in FIGURE 1 is an assembly consisting of a pair of connector shell halves shown in FIGURES 4 and 5 of the drawing, and designated by the reference numeral 8. These halves are provided with what may be designated buttons 9 and 10 at one end that are inserted into pockets 11 and 12 having slots 13 to receive the shanks 14 by which the buttons are extended. When assembled, flap 15 and flange 16 at the other end of the shell half are joined by fusion welding.

A shell liner of a rubber-like substance 6, shown in FIGURES 11 and 12, is of a length to fit loosely around the rectangular corner-rounded conduit. This shell liner seals off the joint between the conduit ends. After assembling the shell halves, the shell liner 6 is uniformly coated with an adhesive and the entire inner surface of the connector shell is uniformly coated with the same adhesive, but the tabs 17, FIGURE 1, on the corner of the shell halves are not coated. The shell liner is cemented uniformly and smoothly to the inner surface of the shell and must not be wrinkled or puckered, with the joint of the shell liner positioned as at 7, FIGURE 1.

The shell is shown in FIGURE 1 with ribs 18 of graduated lengths on the sides, which act as spacers for the draw bands 19, so that the draw bands assume a catenary-like curve along the straight sides of the conduit when drawn tight, to provide a substantially uniform tension or sealing force perpendicular to the walls of the conduit. The shell halves are also provided with rails 20 that have retainer lugs 21 which prevent the draw bands from being displaced out of alignment. By varying the size of the ribs 18, uniform tension produced by the draw bands can be applied to pipe or conduit sections of any contour.

With reference to FIGURES 8, 9 and 10, the draw bands 19 consist of two straps; 19a the bottom strap and 19b the top strap. The bottom strap 19a is at each of its ends snubbed around members 27 and 28 of the buckle 26, as shown in FIGURE 10. The top strap 19b is provided with two loops 23 formed by heat fusing the ends 24 to the strap body as shown in FIGURE 8. The loose ends of the top strap 19b are fed through the center of the buckles 26, FIGURE 9, to which the bottom strap has already been attached, in the manner shown in FIGURE 10, so that tension exerted on the two loops 23 at the ends of the top strap draws the portion 27 of the buckle against the portion 28 to hold the top strap 19b in place. The straps are made of oriented polypropylene or other material having suitable flexural and tensile properties and compatible with the earth burial environment.

When the shell halves, shell liner, and draw bands have been assembled and installed onto two conduit sections at a juncture, the top straps 19b are drawn tight to hold the shell and liner in sealing contact with the conduits. The conduits thus sealed eliminate the entrance of silt into their ducts.

It is evident from the foregoing description of this invention that conduit connectors made in accordance therewith provide a strong and durable seal of considerable duration and being made of molded plastic products, they are not too costly when made in large quantities.

Although one embodiment of the invention has been herein illustrated and described, it will be evident to those skilled in the art that various modifications may be made in the details of construction without departing from the principles herein set forth. It is also evident that the invention may be utilized on rectangular, round or otherwise contoured pipes or conduit sections for the conveying of materials such as liquids, gases, or perhaps even people (as in tunnels) particularly where the requirement is to prevent moisture and silt from entering the conduit or passageway.

I claim:

1. Connectors for joining and sealing abutting conduits having similar polygonal cross-sections in axial alignment comprising a sealing shell liner of substantial width to extend across the abutting ends of the conduits, and of sufficient length to completely encircle the abutting conduits, a plurality of connector shell sections joined and interlocked at their ends, said shell liner attached to said shell sections, said sections having cut-out portions for conforming the section to the corner contour of the conduit having radially outwardly extending spacing means located intermediate said cut-out portions the peripheral face of which assumes a catenary-like curve spaced from the sides of the conduit, a plurality of draw bands extending around said connector shell in contact with said outwardly extending spacing means for securely fastening said connector shell and exerting a sealing force through the shell liner to the conduit walls and means for securing said draw bands in their drawn position.

2. Connectors for joining and sealing abutting conduits as in claim 1 in which the spacing means consists of ribs of graduated length to provide uniform tension of the straps around the conduit joint.

3. Connectors for joining and sealing abutting conduits as in claim 1 in which the shell sections are provided with rails and retainer lugs for maintaining alignment of the draw bands.

References Cited

UNITED STATES PATENTS

| | | | |
|---|---|---|---|
| 583,926 | 6/1897 | McRoy | 285—28 |
| 2,530,700 | 11/1950 | Jewell et al. | 285—420 X |
| 2,738,207 | 3/1956 | Twigg | 285—408 |
| 3,104,898 | 9/1963 | MacDonald | 285—367 X |
| 3,112,543 | 12/1963 | Derrickson | 24—16 X |
| 3,164,401 | 1/1965 | Fawkes | 285—369 X |

FOREIGN PATENTS 740,882  11/1932  France.

DAVID J. WILLIAMOWSKY, Primary Examiner

DAVE W. AROLA, Assistant Examiner

U.S. Cl. X.R.

24—16; 285—28, 420